United States Patent
Athanasiou et al.

(10) Patent No.: US 12,551,599 B2
(45) Date of Patent: Feb. 17, 2026

(54) MELT-AND-MELD APPROACH TO REPAIR TISSUE DEFECTS

(71) Applicant: THE REGENTS OF THE UNIVERSITY OF CALIFORNIA, Oakland, CA (US)

(72) Inventors: Kyriacos A. Athanasiou, Irvine, CA (US); Jerry C. Hu, Irvine, CA (US); Heenam Kwon, Irvine, CA (US); Wendy E. Brown, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 936 days.

(21) Appl. No.: 17/368,394

(22) Filed: Jul. 6, 2021

(65) Prior Publication Data
US 2022/0001080 A1    Jan. 6, 2022

Related U.S. Application Data

(60) Provisional application No. 63/048,430, filed on Jul. 6, 2020.

(51) Int. Cl.
| A61L 27/54 | (2006.01) |
| A61B 18/06 | (2006.01) |
| A61B 18/20 | (2006.01) |
| A61L 27/36 | (2006.01) |
| A61L 27/38 | (2006.01) |

(52) U.S. Cl.
CPC .......... *A61L 27/54* (2013.01); *A61L 27/3633* (2013.01); *A61L 27/38* (2013.01); *A61B 18/06* (2013.01); *A61B 18/20* (2013.01); *A61L 2430/02* (2013.01); *A61L 2430/06* (2013.01); *A61L 2430/24* (2013.01); *A61L 2430/34* (2013.01); *A61L 2430/38* (2013.01)

(58) Field of Classification Search
None
See application file for complete search history.

(56) References Cited

U.S. PATENT DOCUMENTS

| 5,368,858 | A | 11/1994 | Hunziker |
| 5,824,015 | A | 10/1998 | Sawyer |
| 5,842,477 | A * | 12/1998 | Naughton ............ A61L 27/3834 623/902 |
| 6,001,352 | A | 12/1999 | Boyan et al. |
| 6,372,494 | B1 | 4/2002 | Naughton et al. |
| 6,511,958 | B1 | 1/2003 | Atkinson et al. |
| 6,582,960 | B1 | 6/2003 | Martin et al. |
| 6,835,377 | B2 | 12/2004 | Goldberg et al. |
| 6,841,150 | B2 | 1/2005 | Halvorsen |
| 6,949,252 | B2 | 9/2005 | Mizuno et al. |
| 7,141,072 | B2 | 11/2006 | Geistlich et al. |
| 7,273,756 | B2 | 9/2007 | Adkisson et al. |
| 7,887,843 | B2 * | 2/2011 | Libera .................. C12N 5/0655 623/23.72 |
| 8,529,957 | B2 | 9/2013 | Turzi et al. |
| 8,900,860 | B2 | 12/2014 | Huang |
| 9,598,675 | B2 | 3/2017 | Shim et al. |
| 9,993,504 | B2 | 6/2018 | Keller et al. |
| 2001/0053384 | A1 | 12/2001 | Greenleaf et al. |
| 2004/0127963 | A1 | 7/2004 | Uchida et al. |
| 2005/0147959 | A1 | 7/2005 | Frondoza et al. |
| 2008/0145357 | A1 | 6/2008 | Story et al. |
| 2010/0249801 | A1 | 9/2010 | Sengun et al. |
| 2011/0184530 | A1 | 7/2011 | Datta et al. |
| 2016/0346025 | A1 | 12/2016 | Bonutti et al. |
| 2017/0127929 | A1 | 5/2017 | Schutt et al. |
| 2018/0333896 | A1 | 11/2018 | Tapsak et al. |
| 2019/0085292 | A1 | 3/2019 | Athanasiou et al. |
| 2021/0187036 | A1 | 6/2021 | Zheng |

FOREIGN PATENT DOCUMENTS

| EP | 1018987 B1 | 10/2014 |
| GB | 2395196 A | 5/2004 |
| JP | 6-505656 A | 6/1994 |

(Continued)

OTHER PUBLICATIONS

Jones, Hannah R., and Dennis C. Crawford. "An autologous tissue implant, NeoCart, for treatment of hyaline cartilage injury in the knee." Operative Techniques in Orthopaedics 24.4 (2014): 264-270. (Year: 2014).*

Huang et al "Cell-Based tissue engineering strategies used in the clinical repair of articular cartilage," Biomaterials 98 (2016): 1-22. Aug. 2016.

Thermo Fisher Scientific, "Growth Factors in Thermo Scientific HyClone Cell Culture Serum." available on company's webpage, Application Note S0801, copyright 2007 (Year: 2007).

Caron et al. "Redifferentiation of dedifferentiated human articular chondrocytes: comparison of 2D and 3D cultures" Osteoarthritis and Cartilage 20 (Jun. 30, 2012) 1170-1178.

Saadeh et al. "Human cartilage engineering: chondrocyte extraction, proliferation, and characterization for construct development." Annals of plastic surgery 42.5 (1999): 509-513.

(Continued)

*Primary Examiner* — Robert J Yamasaki
(74) *Attorney, Agent, or Firm* — NGUYEN TARBET IP LAW

(57) ABSTRACT

The present invention is a multi-stage treatment that heals tissue or organ damage (e.g., linear defects, fissures, and fibrillations, as well as focal and large defects) in collagen-rich tissues and organs such as articular cartilage. The present invention includes methods 1) to prime tissues in preparation for treatment, which comprises "melting" the tissue matrix, 2) to add or fill the damaged area with a "melding" agent, comprising of endogenous or exogenous tissue matrix, with or without cells, with or without exogenous biomaterials, and with or without endogenous or exogenous enzymes, such that the melding agent enhances anchoring into the defect for the purpose of integration and/or tissue healing. The Melt-and-Meld process can also be applied in conjunction with any existing treatments of tissue or organ defects.

8 Claims, 5 Drawing Sheets

(56) References Cited

FOREIGN PATENT DOCUMENTS

| JP | 2008-178670 A | 8/2008 |
|---|---|---|
| WO | 92/14513 A1 | 9/1992 |
| WO | WO2016040476 A1 | 3/2016 |

OTHER PUBLICATIONS

Bernstein et al. Tissue Engineering Auricular Cartilage Using Late Passage Human Auricular Chondrocytes. Annals of Plastic Surgery. vol. 80, Supplement 4, Apr. 2018.

Blanco et al. Differentiation-dependent effects of IL-1 and proliferation are related to inducible nitric TGF-beta on human articular chondrocyte. J Immunol 1995; 154:4018-4026.

Caron et al. Redifferentiation of dedifferentiated human articular chondrocytes: comparison of 2D and 3D cultures. Osteoarthritis and Cartilage 20 (2012) 1170-1178.

Chapman et al. Therapeutic Benefit for Late, but Not Early, Passage Mesenchymal Stem Cells on Pain Behaviour in an Animal Model of Osteoarthritis. Stem Cells International, vol. 2017, Article ID 2905104, 11 pages.

Dell'Accio et al. Microenvironment and phenotypic stability specify tissue formation by human articular cartilage-derived cells in vivo. Experimental Cell Research 287 (2003) 16-27.

Giannoni et al. Autologous chondrocyte implantation (ACI) for aged patients: development of the proper cell expansion conditions for possible therapeutic applications. OsteoArthritis and Cartilage (2005) 13, 589-600.

Hsieh-Bonassera et al. Expansion and Redifferentiation of Chondrocytes from Osteoarthritic Cartilage: Cells for Human Cartilage Tissue Engineering. Tissue Engineering: Part A vol. 15, No. 11, 2009.

Huang et al. Cell-based tissue engineering strategies used in the clinical repair of articular cartilage. Biomaterials. Aug. 2016 ; 98: 1-22.

Huang et al. Effects of passage No. and post-expansion aggregate culture on tissue engineered, self-assembled neocartilage. Acta Biomater. Oct. 1, 2016; 43: 150-159.

Ko et al. Down-Regulation of Transglutaminase 2 Stimulates Redifferentiation of Dedifferentiated Chondrocytes through Enhancing Glucose Metabolism. Int. J. Mol. Sci. 2017, 18, 2359.

Kudva et al. Initiating human articular chondrocyte re-differentiation in a 3D system after 2D expansion. J Mater Sci: Mater Med (2017) 28:156.

Ma et al. Gene expression profiling of dedifferentiated human articular chondrocytes in monolayer culture. Osteoarthritis and Cartilage 21 (2013) 599-603.

Makris et al. Combined use of chondroitinase-ABC, TGF-β1 and collagen crosslinking agent lysyl oxidase to engineer functional neotissues for fibrocartilage repair. Biomaterials. Aug. 2014 ; 35(25): 6787-6796.

Murphy et al. TGF-b1, GDF-5, and BMP-2 Stimulation Induces Chondrogenesis in Expanded Human Articular Chondrocytes and Marrow-Derived Stromal Cells. Stem Cells 2014;33:762-773.

Murphy et al. Enhancing Post-Expansion Chondrogenic Potential of Costochondral Cells in Self-Assembled Neocartilage. PLOS One, Feb. 2013, vol. 8, Issue 2, e56983.

Tan et al. Passage-Dependent Relationship between Mesenchymal Stem Cell Mobilization and Chondrogenic Potential. Osteoarthritis Cartilage. Feb. 2015 ; 23(2): 319-327.

Wang et al. Trophic Stimulation of Articular Chondrocytes by Late-Passage Mesenchymal Stem Cells in Coculture. Journal of Orthopaedic Research, Dec. 2013.

Blain et al. Disassembly of the vimentin cytoskeleton disrupts articular cartilage chondrocyte homeostasis. Matrix Biol. Sep. 2006;25(7):398-408. Epub Jun. 18, 2006.

Brown et al. Ammonium-Chloride-Potassium Lysing Buffer Treatment of Fully Differentiated Cells Increases Cell Purity and Resulting Neotissue Functional Properties. Tissue Engineering: Part C vol. 22, No. 9, 2016.

Capín-Gutiérrez et al. Cytoskeleton disruption in chondrocytes from a rat osteoarthrosic (OA)-induced model: its potential role in OA pathogenesis. Histol Histopathol. Oct. 2004; 19(4):1125-32. doi: 10.14670/HH-19.1125.

Choi et al. Fetal Cartilage-Derived Cells Have Stem Cell Properties and Are a Highly Potent Cell Source for Cartilage Regeneration. Cell Transplantation, vol. 25, pp. 449-461, 2016.

Duan et al. Alteration of viscoelastic properties is associated with a change in cytoskeleton components of ageing chondrocytes from rabbit knee articular cartilage. Mol Cell Biomech. Dec. 2011; 8(4):253-74.

Wangping et al. Effect of the disruption of three cytoskeleton components on chondrocyte metabolism in rabbit knee cartilage. Chin Med J (Engl). 2014;127(21):3764-70. PMID: 25382333.

Guilak et al. The deformation behavior and viscoelastic properties of chondrocytes in articular cartilage. Biorheology. 2000;37(1-2):27-44.

Kerrigan et al. Stimulation of regulatory vol. decrease (RVD) by isolated bovine articular chondrocytes following F-actin disruption using latrunculin B. Biorheology. 2005;42(4):283-93.

Nofal et al. Latrunculin and cytochalasin decrease chondrocyte matrix retention. J. Histochem Cytochem. Oct. 2002;50(10):1313-24.

Rottmar et al. Interference with the contractile machinery of the fibroblastic chondrocyte cytoskeleton induces re-expression of the cartilage phenotype through involvement of PI3K, PKC and MAPKs. Exp Cell Res. Jan. 15, 2014;320 (2):175-87. doi: 10.1016/j.yexcr. 2013.11.004. Epub Nov. 15, 2013. PMID:24246223.

Smith et al. Effects of shear stress on articular chondrocyte metabolism. Biorheology. 2000;37(1-2):95-107.

Smith et al. Pressure and shear differentially alter human articular chondrocyte metabolism: a review. Clin Orthop Relat Res. Oct. 2004;(427 Suppl):S89-95.

Takigawa et al. Cytoskeleton and differentiation: effects of cytochalasin B and colchicine on expression of the differentiated phenotype of rabbit costal chondrocytes in culture. Cell Differ. Aug. 1984;14(3):197-204.

Trickey et al. The role of the cytoskeleton in the viscoelastic properties of human articular chondrocytes. Journal of Orthopaedic Research 22 (2004) 131-139.

Yourek et al. Cytoskeletal Changes of Mesenchymal Stem Cells During Differentiation. ASAIO J. 2007 ; 53(2): 219-228.

Zanetti et al. Induction of Chondrogenesis in Limb Mesenchymal Cultures by Disruption of the Actin Cytoskeleton. The Journal of Cell Biology. vol. 99 Jul. 1984 115-123.

Takebe et al. "Regulation of p38 MAPK phosphorylation inhibits chondrocyte apoptosis in response to heat stress or mechanical stress." International journal of molecular medicine 27.3 (2011): 329-335.

Loening et al. "Injurious mechanical compression of bovine articular cartilage induces chondrocyte apoptosis." Archives of biochemistry and biophysics 381.2 (2000): 205-212.

Kong et al. "Static mechanical stress induces apoptosis in rat endplate chondrocytes through MAPK and mitochondria-dependent caspase activation signaling pathways." PloS one 8.7 (2013): e69403.

Amirkhani et al. "A rapid sonication based method for preparation of stromal vascular fraction and mesenchymal stem cells from fat tissue." BioImpacts: BI 6.2 (2016): 99.

Goldberg, Stanley. "Mechanical/physical methods of cell distribution and tissue homogenization." Proteomic Profiling. Humana Press, New York, NY, 2015. 1-20.

Kim et al. "The effect of antiseptics on adipose-derived stem cells." Plastic and reconstructive surgery 139.3 (2017): 625.

Jeon et al. "Dynamic compression improves biosynthesis of human zonal chondrocytes from osteoarthritis patients." Osteoarthritis and Cartilage 20.8 (2012): 906-915.

Stoddart et al. "Enhanced matrix synthesis in de novo, scaffold free cartilage-like tissue subjected to compression and shear." Biotechnology and bioengineering 95.6 (2006): 1043-1051.

Scientific, Thermo. "Growth factors in thermo scientific hyclone cell culture serum." Application Note (2007) 2 pages.

MB, Eslaminejad. "Costal versus articular chondrocytes in alginate three-dimensional cultures." (2009): 129-136.

(56) References Cited

OTHER PUBLICATIONS

JPO, "Office Action", issued in connection with Japanese Patent Application 2023-500069, dated Jun. 26, 2025, 12 pages (7 pages of English Translation and 5 pages of official copy).

Van De Breevaart Bravenboer., "Improved Cartilage Integration And Interfacial Strength After Enzymatic Treatment in a Cartilage Transplantation Model", Arthritis Research & Therapy, vol. 6, No. 5, Aug. 6, 2004, pp. R469-R476.

Gibson et al., "Apoptosis of Terminally Differentiated Chondrocytes in Culture", Experimental Cell Research, vol. 233, Mar. 24, 1997, pp. 372-382.

Okubo et al., "Proliferation Medium In Three-Dimensional Culture of Auricular Chondrocytes Promotes Effective Cartilage Regeneration In Vivo", Regenerative Therapy, vol. 11, Oct. 1, 2019, pp. 306-315.

Khalid et al., "Necrosis Pathology", Online available at <https://www.ncbi.nlm.nih.gov/books/NBK557627/>, Jan. 2025, 6 pages.

Bhola et al., "Determinism and Divergence of Apoptosis Susceptibility In Mammalian Cells", Journal of Cell Science, vol. 122, Sep. 15, 2009, pp. 4296-4302.

Sabbagh et al., "The Selective Increase in Caspase-3 Expression in Effector but Not Memory T Cells Allows Susceptibility to Apoptosis", The Journal of Immunology, vol. 173, Nov. 1, 2004, 10 pages.

Kang et al., "Effect of Chondrocyte Passage Number on Histological Aspects of Tissue-Engineered Cartilage", Bio-Medical Materials and Engineering, vol. 17, Dec. 8, 2007, pp. 269-276.

Thomas et al., "Chondrocyte Death by Apoptosis is Associated With Cartilage Matrix Degradation", Osteoarthritis and Cartilage, vol. 15, 2007, pp. 27-34.

Thomas et al., "Variations in Chondrocyte Apoptosis May Explain the Increased Prevalence of Osteoarthritis in Some Joints", Rheumatology International, vol. 31, 2011, pp. 1341-1348.

Pettenuzzo et al., "Biomechanics of Chondrocytes and Chondrons in Healthy Conditions and Osteoarthritis: A Review of the Mechanical Characterisations at the Microscale", Biomedicines, vol. 11, Jul. 8, 2023, 22 pages.

Cote et al., "Single-Cell Differences in Matrix Gene Expression Do Not Predict Matrix Deposition", Nature Communications, vol. 7, No. 10865, Mar. 3, 2016, 13 pages.

Li et al., "Ferroptosis: Past, Present and Future", Cell Death & Disease, vol. 11, No. 88, 2020, 13 pages.

USPTO, "Final Office Action" issued in connection with U.S. Appl. No. 17/496,391, dated Apr. 1, 2025, 13 pages.

Xu et al., "Apoptosis and Apoptotic Body: Disease Message and Therapeutic Target Potentials", Bioscience Reports, vol. 39, No. BSR20180992, Jan. 18, 2019, 17 pages.

Weniger et al., "Molecular Biology of Hodgkin Lymphoma", Leukemia, vol. 35, Mar. 8, 2021, pp. 968-981.

* cited by examiner

Melt-and-Meld
(meld: transglutaminase)

Melt-and-Meld
(melt: collagenase,
meld: LOXL2)

Melt-and-Meld
(melt: pronase,
meld: LOXL2)

No treatment

MELT-AND-MELD APPROACH TO REPAIR TISSUE DEFECTS

CROSS-REFERENCES TO RELATED APPLICATIONS

This application is a non-provisional and claims benefit of U.S. Provisional Application No. 63/048,430 filed Jul. 6, 2020, the specification of which is incorporated herein in their entirety by reference.

FIELD OF THE INVENTION

The present invention features a method of treating or repairing tissue defects, more particularly, a method that implements a "Melt-and-Meld" process to repair the tissue defects.

BACKGROUND OF THE INVENTION

Articular cartilage damage, often caused by "wear and tear" or injuries (e.g., Sports-related), results in degeneration and osteoarthritis (OA). OA currently affects 31 million adults in the United States; the number of arthritis patients is projected to be 78 million by 2040. Cartilage damage at the early stage is characterized by defects, such as linear (e.g., straight, curved, or irregular lines) defects, fibrillations, or fissures (e.g., gouge defects). The linear defects, fissures, and fibrillations are characterized by rough, uneven, and irregular edges that serve as loci of further degeneration. Thus, these defects worsen and enlarge. Most of these defects are left untreated. Fibrillar defects are usually not treated. For the few defects that are treated, removal of debris is often performed arthroscopically using mechanical means. Specifically, the edges of the defects are trimmed and smoothed to reduce the stress concentrations at the edges of the defects. Currently, smoothing of the edges is performed using mechanical means, with tools such as oscillating shavers, curettes, and other debridement tools (FIG. 1). The result is a cartilage defect with smoothed edges and reduced, but not eliminated, propensity toward further degeneration. No additional treatments to heal these linear defects, fissures, and fibrillations are available, leading to small or focal defects, eventually to large defects, and ultimately, OA. For focal defects, cell-based treatments for cartilage defects (i.e., tissue-engineered cartilage) are emerging as alternatives to current approaches (e.g., microfracture, chondroplasty, and mosaicplasty). For large defects, there are no cell-based treatments currently available. For OA, the current treatment is the use of joint prostheses. Thus, there is a great need to develop an effective treatment for linear defects, fissures, and fibrillations, as well as focal defects and large defects to potentially prevent OA development. Similar arguments can be made or other tissues in the body.

The present invention is a multi-stage treatment that heals the early forms of tissue damage (e.g., linear defects, fissures, and fibrillations) in articular cartilage, as well as focal and large defects to potentially stop the development of OA. In some embodiments, technologies described herein may be applied to any tissue that needs repair, such as skin, cartilage, tendon, meniscus, temporomandibular joint (TMJ), penile tissues, urogenital tissues (e.g., urological tissues), intervertebral discs, bone, facet, ligaments, and other collagen-rich tissues and organs. The present invention includes methods 1) to prime tissues in preparation for treatment, which comprises "melting" the tissue matrix, 2) to add or fill the damaged area with a "melding" agent, comprising of endogenous or exogenous tissue matrix, with or without cells, with or without exogenous biomaterials, and with or without endogenous or exogenous enzymes, such that the melding agent enhances anchoring into the defect for the purpose of integration and/or tissue healing.

The present invention differs from current treatments by using non-mechanical means to melt the defect edges. Stress concentrations are further reduced by the melding process, which fills the defect with a suitable tissue matrix. The present invention is advantageous because it has the potential to slow, delay, and/or halt further degenerative changes emanating from linear defects, fissures, fibrillations, focal defects, or large defects in tissues and organs. The present invention is also advantageous because it has the potential to integrate implants with native tissue or native tissue with native tissue. There are no other treatments that exist for the indications that have been described, making the invention described herein both novel and significant. The Melt-and-Meld process described herein can also be applied in conjunction with any existing cartilage treatment where it is desirable to heal tissue defects. Moreover, because the Melt-and-Meld process can be applicable to collagenous tissues in general, the technologies MI have utility in healing skin, penile tissues, urogenital tissues in general (e.g., urological tissues), bone, ligament, tendon, meniscus, TMJ, facet, intervertebral discs, and other collagen-rich tissues and organs, as well.

BRIEF SUMMARY OF THE INVENTION

It is an objective of the present invention to provide for a Melt-and-Meld process that allows for the treatment of early forms of tissue damage (e.g., linear defects, fissures, and fibrillations), as well as focal and large defects, as specified in the independent claims. Embodiments of the invention are given in the dependent claims. Embodiments of the present invention can be freely combined with each other if they are not mutually exclusive.

In some embodiments, the present invention features a method of treating or repairing a tissue defect. In some embodiments, the method comprises identifying the defect and melting the defect by applying melting agents. In some embodiments, the method comprises identifying the defect and melding the defect by applying melding agents. In some embodiments, the method comprises identifying the defect, melting the defect by applying melting agents, and melding the defect by applying melding agents.

In other embodiments, the present invention features methods 1) to prime tissues in preparation for treatment, which comprises of "melting" the tissue matrix, 2) to add or fill the damaged area with a "melding" agent, comprising endogenous or exogenous tissue matrix, with or without cells, with or without exogenous biomaterials, and with or without endogenous or exogenous enzymes, such that the melding agent enhances anchoring into the defect for the purpose of integration and/or tissue healing, One of the unique and inventive technical features of the present invention is the Melt-and-Meld process/technology. Without wishing to limit the invention to any theory or mechanism, it is believed that the technical feature of the present invention advantageously provides for a multi-stage treatment that heals the early forms of tissue damage (e.g., linear defects, fissures, and fibrillations) in articular cartilage, as well as focal and large defects to potentially halt the development of OA. Additionally, the Melt-and-Meld method can be used with any existing cartilage treatment where it would be desirable or beneficial to heal defects.

Furthermore, the methods described herein are not limited to just the treatment of articular cartilage and can be applicable to collagenous tissues in general. The technologies described herein will have utility in healing skin, penile tissues, urogenital tissues in general (e.g., urological tissues), bone, ligament, tendon, meniscus, TMJ, facet, intervertebral discs, and other collagen-rich tissues and organs, as well. In some embodiments, methods described herein provide for effective treatment of early forms of tissue damage (e.g., linear defects, fissures, and fibrillations), as well as focal and large defects in collagenous tissues or organs. In other embodiments, methods described herein allow for the resurfacing of linear defects, fissures, or fibrillations, as well as filling and/or healing of focal or large defects in collagenous tissues or organs. None of the presently known prior references or work has the unique, inventive technical feature of the present invention.

Furthermore, the prior references teach away from the present invention. For example, most linear defects, fissures, and fibrillations are left untreated. If treatment is performed, it often entails the edges of the defects being trimmed and smoothed via mechanical means. Currently, the prior literature teaches of smoothing the edges using mechanical means, with tools such as oscillating shavers, curettes, and other debridement tools. The result is a cartilage defect with smoothed and reduced but not eliminated edges with a propensity toward further degeneration. No further treatments to heal these linear defects, fissures, and fibrillations are available. Therefore, in brief, the edges of the defects are left separated and are not melded together as featured in the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 3:
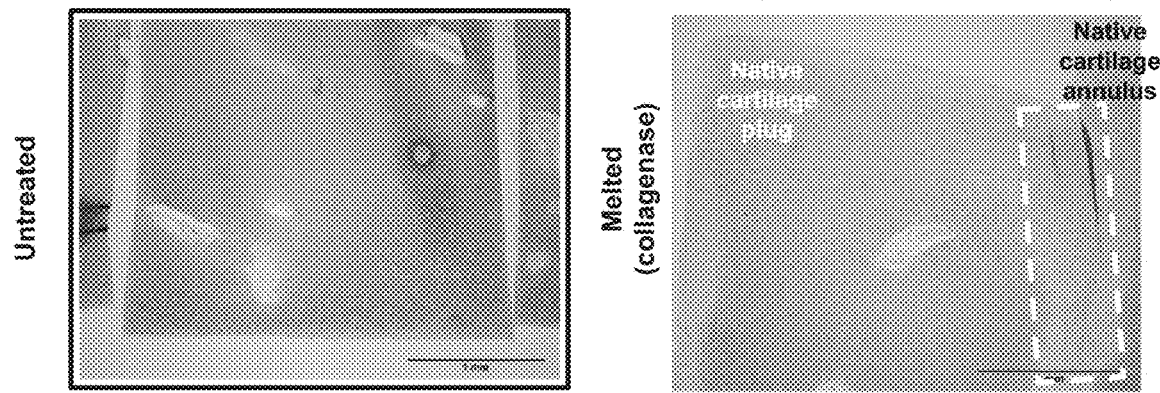
Figure 3:
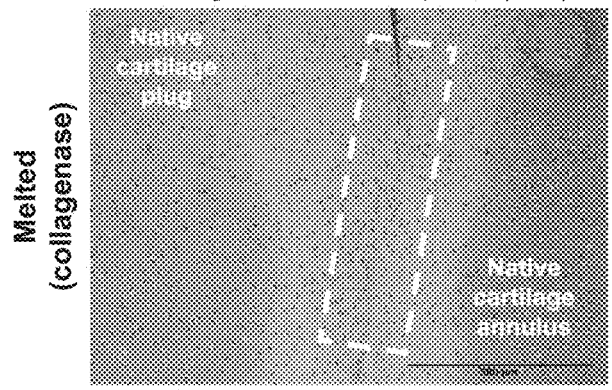
Figure 3:
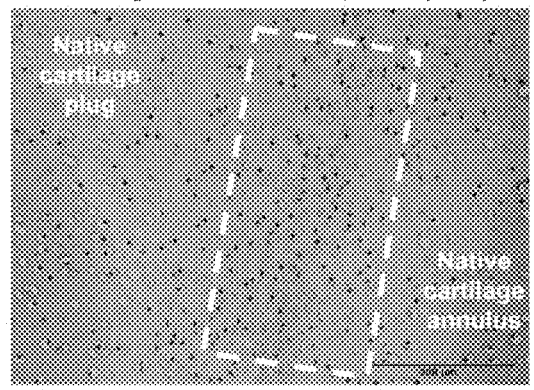

FIG. 3 shows the integration of native cartilage to native cartilage after applying the Melt-and-Meld process. Defects were created in bovine cartilage explants, and the surfaces to be integrated were treated with collagenase to melt the surface. As a control, no melting treatment was used. Specifically, defects were created in bovine articular cartilage explants. Cartilage explants (6 mm diameter) were obtained from the distal femur of juvenile bovine stifle joints, Cartilage defects (3 mm diameter) were punched from the core of the explants. The surfaces of the explants (6 mm diameter) and the 3 mm cartilage punches were treated with collagenase, a melting agent, at 250 units/ml for 10 min. After 4 weeks, the integration between the cartilage punches and explants was assessed. As a control, no melting treatment was used.

Figure 4:
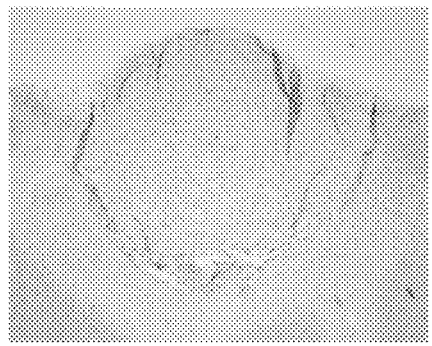
Figure 4:
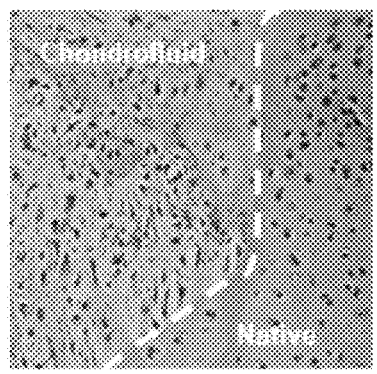
Figure 4:
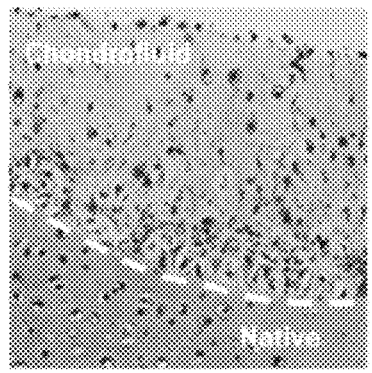
Figure 4:
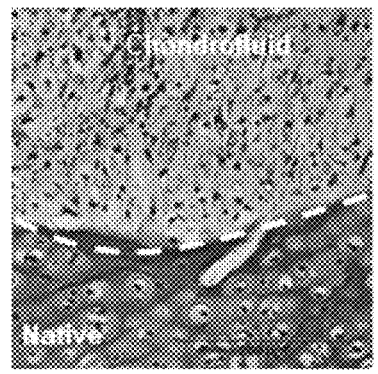
Figure 4:
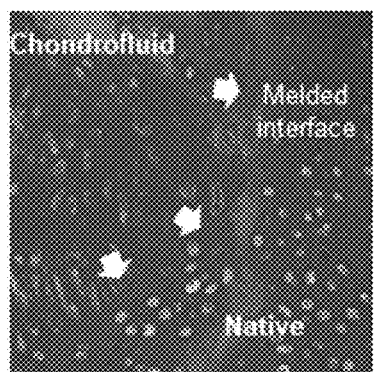
Figure 4:
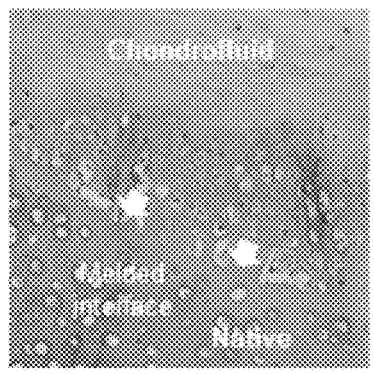
Figure 4:
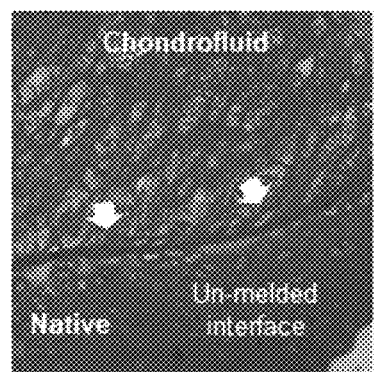

FIG. 4 shows the defect filling with biofluid (i.e., a mixture or slurry of cells and/or ECM components) and integration of biofluid with native cartilage using the Melt-and-Meld process described herein. In this case, the specific biofluid used is chondrofluid (i.e., a mixture or slurry of cartilage cells and/or cartilage ECM components). The Melt-and-Meld process can fill/heal defects and allows chondrofluid to integrate into native tissue to heal cartilage defects. Defects were created in bovine cartilage explants. Defects were treated with either collagenase or protease to melt the surface of the defect. Chondrofluid was added to the defect and treated with a melding agent (i.e., transglutaminase, LOXL2). No treatment (melt or meld) was used as a control. Gouge defects (1 mm diameter, 2-3 mm long) were created on the surface of bovine cartilage explants. The surfaces of the gouge defects were melted with either collagenase (250 units/ml for 10 min) or pronase (5 units/ml for 5 min). Chondrofluid was generated from engineered bovine neocartilage derived from primary cells. Briefly, primary cells were seeded into 5 mm diameter agarose wells and form engineered neocartilage using the self-assembling process. After 4 weeks of culture, the engineered neocartilage was digested in 0.2% collagenase, and the cell and matrix suspension (i.e., chondrofluid) was obtained. The chondrofluid was added to each defect. A melding agent (i.e., LOXL2) was added to chondrofluid at cell seeding. After 4 weeks, the integration between the cartilage punches and explants was assessed. No melting treatment was used as a control.

Figure 5:
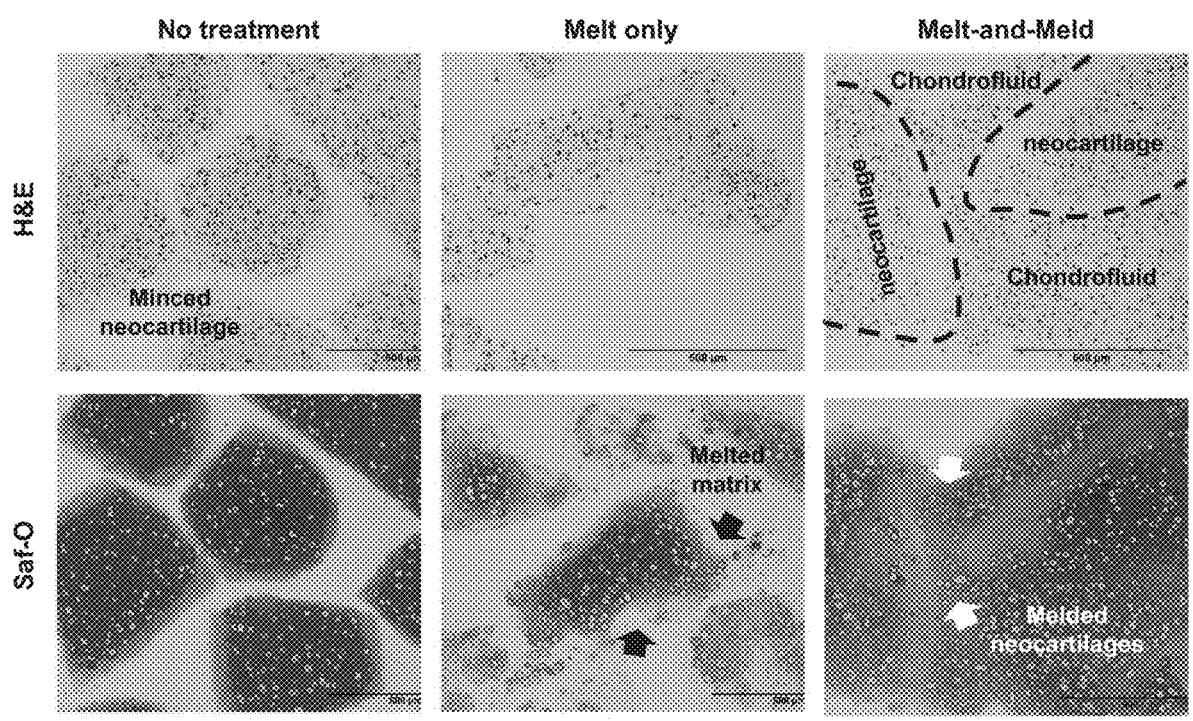

FIG. 5 shows the integration of neocartilage using the Melt-and-Meld process described herein. The Melt-and-Meld process can integrate neocartilage implants to heal defects in cartilage by using chondrofluid as the melding agent. Minced neocartilages were treated with collagenase (melt), and chondrofluid was added as a melding agent to integrate the minced neocartilage. No treatment (melt or meld) was used as a control. Specifically, engineered porcine neocartilage was generated from porcine costal chondrocytes. Briefly, minipig costal chondrocytes were chondrogenically expanded in the presence of transforming growth factor-beta 1 (TGF-β1), fibroblast growth factor 2 (FGF2), and platelet-derived growth factor (PDGF), and rejuvenated using the aggregate redifferentiation process, supplemented with TGF-β1, growth differentiation factor 5 (GDF5), and bone morphogenetic protein 2 (BMP2). Cells then underwent the self-assembling process to form engineered neocartilage. The engineered cartilage was treated with TGF-β1, chondroitinase-ABC (c-ABC), and lysyl oxidase-like 2 protein (LOXL2) during 4 weeks of culture. The engineered cartilages were minced into small pieces, and the surface of the minced neocartilages was treated with a melting agent (collagenase, 250 units/ml for 10 min). Chondrofluid was added as a melding agent to integrate the minced neocartilage. Chondrofluid was obtained by digesting the engineered cartilages in 0.2% collagenase. A no-treatment group was used as a control.

Figure 6A:
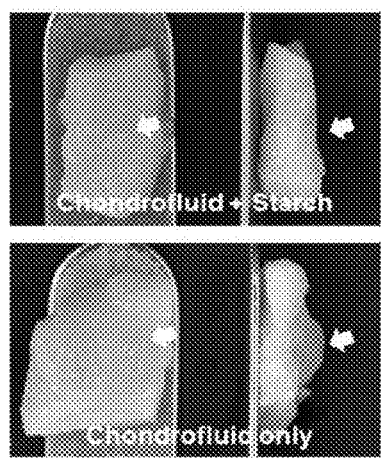
Figure 6B:
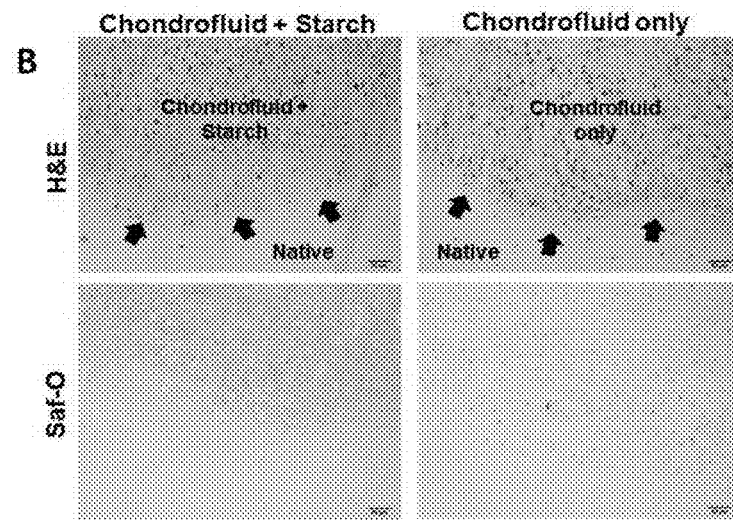

FIGS. 6A and 6B show chondrofluid+exmenous biomaterials (e.g., bioadhesive materials) improved integration to heal defects in human cartilage. FIG. 6A shows that defects filled with chondrofluid+starch filled the defects to a level matching the articular surface. The chondrofluid only group protruded over the surface of the defect. FIG. 6B shows chondrofluid+starch interpenetrated and integrated into native tissue and displayed intense Safranin O (Saf-O)

staining. The chondrofluid only group showed integration without interpenetration characteristics and showed weak Saf-O staining. For FIGS. 6A and 6B defects were created in human patella cartilage explants. Defects were treated with collagenase to melt the surface of the defect. Chondrofluid was generated using neonatal human costal chondrocytes. The generated chondrofluid was combined with 1% starch and added to the defect. Chondrofluid only was used as a control. Method: Gouge defects (1 mm-diameter, 2-3 mm long) were created on the surface of human patella explants. The surfaces of the gouge defects were melted with collagenase (250 units/ml for 10 min). Chondrofluid was generated from engineered human neocartilage derived from human neonatal costal chondrocytes. Briefly, human neonatal costal chondrocytes were chondrogenically expanded in the presence of transforming growth factor-beta 1 (TGF-β1), fibroblast growth factor 2 (FGF2), and platelet-derived growth factor (PDGF), and rejuvenated using the aggregate redifferentiation process, supplemented with TGF-β1, growth differentiation factor 5 (GDF5), and bone morphogenetic protein 2 (BMP2). Cells then underwent the self-assembling process to form engineered neocartilage. The engineered cartilage was treated with TGF-β1, c-ABC, and LOXL2 during 4 weeks of culture. After 4 weeks of culture, the engineered human neocartilage was digested in 0.2% collagenase, and the cell and matrix suspension (i.e., chondrofluid) was obtained. The chondrofluid was mixed with 1% starch at a ratio of 1:1 and was added to each gouge defect. After 4 weeks, the integration between the cartilage punches and explants was assessed. A no-melting treatment was used as a control.

Figure 7A:
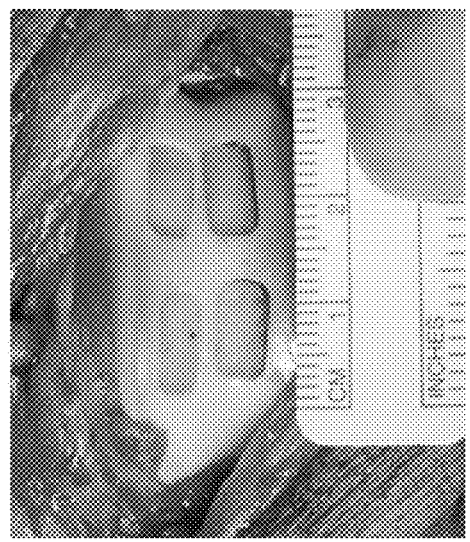
Figure 7B:
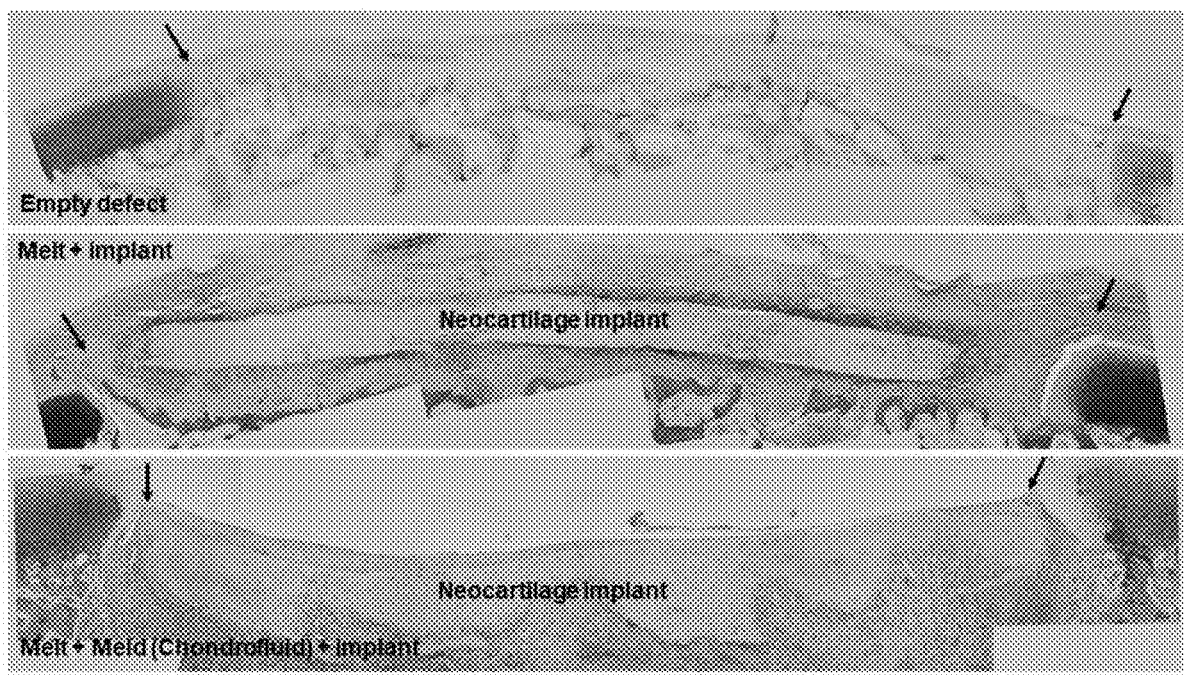

FIGS. 7A and 7B show that Melt-and-Meld can integrate neocartilage implants to heal large defects in cartilage in vivo. FIG. 7A shows a large defect created on the trochlea of the minipig knee, and FIG. 7B shows implantation of neocartilage implants to heal the defects using the Melt-and-Meld technology described herein. Defects were treated with collagenase to melt the surface of the defect. Neocartilage was implanted in the defects either by itself or with chondrofluid as the melding agent. Animals were sacrificed 4 weeks after in vivo implantation. The empty defect was used as a control. Melt-and-Meld allows for neocartilage implants to adhere to the defects and integrate efficiently to the surrounding native tissue. Arrows indicate the created defect sites. Specifically, large defects (5×10 mm) were created on the trochlea of the minipig knee. The defects were treated with collagenase (250 units/ml for 10 min) to melt the surface of the defect. Neocartilage was implanted in the defects either by itself or with chondrofluid as the melding agent. Chondrofluid was derived from engineered porcine neocartilage. Briefly, minipig costal chondrocytes were chondrogenically expanded in the presence of TGF-β1, FGF2, and PDGF and rejuvenated using the aggregate redifferentiation process, supplemented with TGF-β1, GDF5, and BMP2. Cells then underwent the self-assembling process to form engineered neocartilage. The engineered cartilage was treated with TGF-β1, c-ABC, and LOXL2 during 4 weeks of culture. Chondrofluid was obtained by digesting the porcine neocartilage in 0.2% collagenase. Animals were sacrificed 4 weeks after in vivo implantation. Empty defects were used as a control.

DETAILED DESCRIPTION OF THE INVENTION

For purposes of summarizing the disclosure, certain aspects, advantages, and novel features of the disclosure are described herein. It is to be understood that not necessarily all such advantages may be achieved in accordance with any particular embodiments of the disclosure. Thus, the disclosure may be embodied or carried out in a manner that achieves or optimizes one advantage or group of advantages as taught herein without necessarily achieving other advantages as may be taught or suggested herein.

Additionally, although embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. Moreover, while a number of variations have been shown and described in varying detail, other modifications, which are within the scope of the present disclosure, will be readily apparent to those of skill in the art based upon this disclosure. It is also contemplated that various combinations or sub-combinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described herein.

As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

The present invention features a method of treating or repairing a tissue defect. The method comprises identifying the defect, melting the defect by applying melting agents, and melding the defect by applying melding agents. In some embodiments, the present invention features a method of treating or repairing a tissue defect. In some embodiments, the method comprises identifying the defect and melting the defect by applying melting agents. In some embodiments, the method comprises identifying the defect and melding the defect by applying melding agents. In some embodiments, the method comprises identifying the defect, melting the defect by applying melting agents, and melding the defect by applying melding agents.

In some embodiments, tissue may refer to cartilage, skin, bone, facet, ligament, tendon, meniscus, TMJ, penile tissues, urogenital tissues in general (e.g., urological tissues), intervertebral discs, other collagen-rich tissues, or organs.

As used herein, a "defect" may refer to an injury, imperfection, or abnormality that impairs the quality, function, or utility of the tissue in which it is present; it may also refer to an appearance that deviates from healthy or normal morphology. In other embodiments, a "defect" may refer to any alteration in the tissue that changes the appearance, function, structure, mechanics, or biochemical content of said tissue. In further embodiments, the term "defect" is a well-known term to one of ordinary skill in the art.

In some embodiments, a defect may refer to a tissue defect or a cartilage detect. In some embodiments, the defect may be a linear (e.g., straight, curved, or irregular lines)

defects, fibrillations, or fissures (e.g., gouge defects). In some embodiments, linear defects, fissures, and fibrillations are characterized by rough, uneven, and irregular edges that serve as loci of further degeneration. In other embodiments, the defect may be a focal defect or a large defect. In other embodiments, the defect may be in collagenous tissues, cartilage, skin, bone, facet, ligaments, tendons, meniscus, TMJ. penile tissues, urogenital tissues in general (e.g., urological tissues), intervertebral discs, and other collagen-rich tissues and organs.

In some embodiments, a defect may refer to a crack in cartilage tissue. In other embodiments, a defect may refer to a fibrillation in cartilage tissue. In further embodiments, a detect may refer to a hole in cartilage tissue. In some embodiments, a defect may refer to a cut or tear on the skin. In other embodiments, a defect may refer to a tear in a ligament.

As used herein, the term "melt" may refer to a method that causes the solid matrix (such as the extracellular matrix (ECM)) to become deformable, more viscous and/or more flowing, or may loosen up the matrix, which may occur, for example, through the exposure or unwinding or untethering of collagen fibers, fibrils, or triple helix and/or exposing the free ends of collagen molecules. The melting process may also include a method to cleave/cut or break larger solid matrix components into smaller pieces, or the melting process may remove some of the components from the solid matrix.

In some embodiments, a solid matrix is more viscous and/or more flowing after being melted compared to its original state (i.e., the state of the solid matrix before melting agents were applied to the solid matrix). In other embodiments, tissue is more viscous and/or more flowing after being melted compared to its original state (i.e., the state of the tissue before melting agents were applied to the tissue).

As used herein, a "solid matrix" or "extracellular matrix (ECM)" may refer to a non-cellular component present within all tissues and organs, which is made up of a three-dimensional network of extracellular macromolecules, examples which may include, but are not limited to, collagen, enzymes, and glycoproteins. In some embodiments, the ECM may provide structural support in the form of a physical scaffolding for the cellular constituents and may initiate crucial biochemical and biomechanical cues required for tissue morphogenesis, differentiation, and homeostasis. As used herein, "solid matrix" or "extracellular matrix (ECM)" or "ECM" or "matrix" may be used interchangeably.

Figure 1:
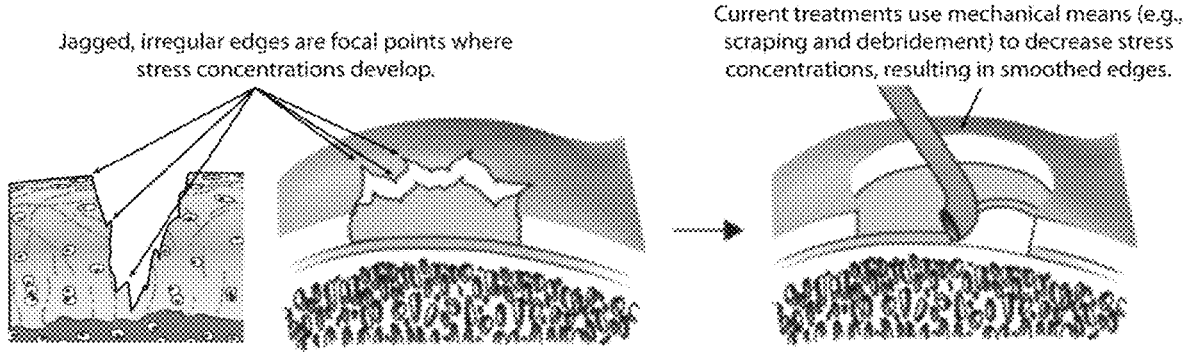
FIG. 1 shows that the stress concentration on cartilage defects results in more damage and degeneration to the tissue, leading to enlargement of the defects and eventually OA. Currently, fibrillar defects are left untreated.
Figure 2:
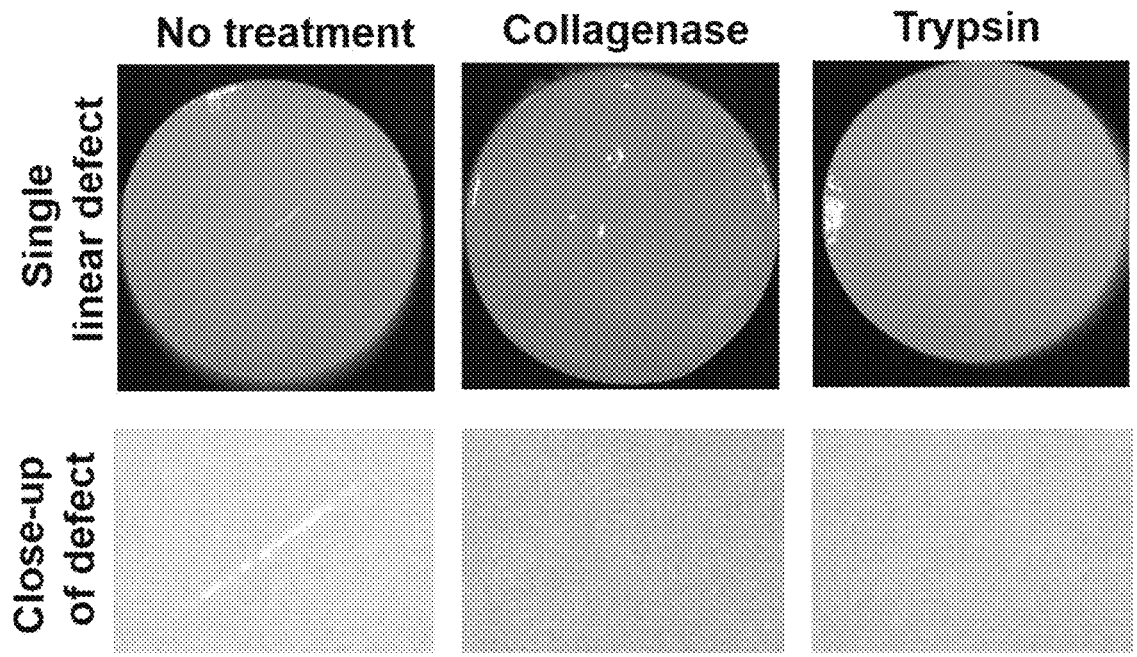
FIG. 2 shows explant morphology after the melting process. Linear defects were created on the surface of bovine cartilage explants and were melted with either collagenase or trypsin to melt the defect.

As used herein, the term "melting agent(s)" may refer to chemicals or enzymes that help to melt a solid matrix. In some embodiments, melting agents may refer to extracellular matrix (ECM) protein-severing agents, denaturants, chaotropic agents, enzymes that break tissues down to macromolecules, charge-removing agents, heat, or combinations thereof (FIG. 2). Non-limiting examples of enzymes that may be used as melting agents include but are not limited to proteases, dispases, pepsins, elastases, hyaluronidases, aggrecanases, matrix metalloproteinases (MMPs), collagenases, or a combination thereof. In some further embodiments, melting agents may include but are not limiting to matrix metalloproteinases (MMPs), guanidinium chloride, sodium dodecyl sulfate (SDS), chondroitinase-ABC (which may be deactivated with zinc sulfate), trypsin (which may be deactivated with α1 anti-trypsin), collagenases (which can be washed out) or a combination thereof. In other embodiments, melting agents may also include lasers, ultrasound, radiofrequency, or a combination thereof. In some embodiments, melting agents described herein free the ECM components from their solid state, allowing the matrix to be deformed. In other embodiments, other agents that decrease the viscosity of tissue, e.g., turning a viscoelastic tissue solid into a viscoelastic tissue fluid, thus, liquifying the resident ECM components, engendering mobility of these components, and allowing them to flow or be manipulated into the defects, are included. In further embodiments, melting agents described herein may be used alone or in combination with each other.

In some embodiments, the melting process is meant to be a surface phenomenon and is only meant to treat the surface of the endogenous and/or exogenous solid matrix (or tissue). In some embodiments, the melting process is allowed to proceed until the solid matrix is melted up to 5 mm in depth. In some embodiments, the melting process is allowed to proceed until the solid matrix is melted up to 4 mm in depth. In some embodiments, the melting process is allowed to proceed until the solid matrix is melted up to 3 mm in depth. In some embodiments, the melting process is allowed to proceed until the solid matrix is melted to 2 mm in depth. In some embodiments, the melting process is allowed to proceed until the solid matrix is melted to 1 mm in depth. In some embodiments, the melting process is allowed to proceed until the solid matrix is melted more than 0.1 mm in depth. In some embodiments, the melting process is allowed to proceed until the solid matrix is melted between 0.1 mm and 5 mm in depth. In other embodiments, the melting process may continue for 5 minutes. In some embodiments, the melting process may continue for 10 minutes. In some embodiments, the melting process may continue for 15 minutes. In other embodiments, the melting process may continue for 20 minutes. In some embodiments, the melting process may continue for 25 minutes. In some embodiments, the melting process may continue for 30 minutes. In other embodiments, the melting process may continue for 1 hour. In further embodiments, the melting process may continue for more than 1 hour. Once the melting process is done, melting agents are washed away or deactivated.

In some embodiments, the melting agents are washed away before all or a bulk of the solid matrix of the tissue (or organ) is destroyed or before there is an irreversible loss of solid matrix component. In other embodiments, the melting agents are deactivated before all or a bulk of the solid matrix of the tissue (or organ) is destroyed or before there is an irreversible loss of solid matrix components. In some embodiments, melting agents may be washed away with water, saline, or cell culture medium. In other embodiments, melting agents may be washed away with any other suitable solution. In some embodiments, the melting agents are deactivated with a chemical that specifically deactivates the melting agent—for example, using the chemical zinc sulfate to deactivate chondroitinase-ABC.

As used herein, the term "melding" may refer to anchoring the melted solid matrix (such as an ECM) to surrounding tissue (i.e., tissue not melted and/or melded by methods described herein) by the formation or addition of macromolecules and/or cells or physical entanglement of molecules (i.e., ECM components). In some embodiments, the melted solid matrix is anchored (i.e., immobilized or fixed) to adjacent native tissue (i.e., tissue that has not been melted or melded by methods described herein).

In other embodiments, melding may refer to friction between two adjacent surfaces, mechanical interference, cell migration, covalent bonds, and/or ionic bonds. In some embodiments, friction between two adjacent surfaces is a result of the melding process and may serve as a means to anchor the melded solid matrix to the surrounding tissue. In some embodiments, the two adjacent surfaces may comprise a surface of the melted tissue defect and a surface of the tissue surrounding the melted tissue defect. In other embodiments, the two adjacent surfaces may comprise the surface of two neighboring tissue matrices. In further embodiments, the two adjacent surfaces may comprise the surface of two neighboring melted tissue matrices.

In other embodiments, cell migration is a result of the melding process and may serve as a means to anchor the melded solid matrix to the surrounding tissue. In some embodiments, mechanical interference is a result of the melding process and may serve as a means to anchor the melded solid matrix to the surrounding tissue. In further embodiments, melding agents described herein promote the aforementioned processes (i.e., creating friction, mechanical interference, cell migration).

In some embodiments, melding may be caused by cell migration. In other embodiments, melding may be caused by mechanical interference. In some embodiments, melding is caused by friction between two adjacent surfaces. In some embodiments, melding is caused by the physical entanglement of molecules in the tissue matrix, including friction between two adjacent surfaces. In some embodiments, the adjacent surfaces comprise a surface of the melted tissue and a surface of the tissue surrounding the defect. In other embodiments, adjacent surfaces comprise a surface of the tissue defect and a surface of the tissue surrounding the defect.

Macromolecule formation can be attained through polymerization or any chemical process where two or more molecules are joined via, for example, a covalent bond. In some embodiments, the formation of macromolecules occurs through the linking of smaller molecules together. In other embodiments, macromolecules are produced (i.e., formed) by cells. In other embodiments, melding may refer to the physical entanglement of molecules (i.e., ECM components).

As used herein, the term "melding agents" may refer to agents used to form or join macromolecules in the presence or absence of cells. In some embodiments, melding agents may include biofluid, any member of the family of lysyl oxidase and lysyl oxidase-like proteins, transglutaminase, riboflavin, vitamin B12, genipin, and bioactive agents that induce the cells into producing said agents or producing a newly synthesized extracellular matrix (ECM) that joins with one or more existing matrix molecules. This latter category includes growth factors such as those belonging to the transforming growth factor (TGF) superfamily and/or others, such as growth differentiation factor (GDF), bone morphogenetic protein (BMP), fibroblast growth factor (FGF), epidermal growth factor (EGF), insulin-like growth factor (IGF) in active and latent forms. In other embodiments, these agents may include biofluids generated from native tissue. In some embodiments, these agents may include biofluids generated from engineered tissue. In further embodiments, melding agents may include ultraviolet light, chemicals that induce the formation of bonds.

In some embodiments, biofluids are generated by using a tissue-degrading enzyme to completely break down engineered tissues to yield a solution of matrix components and cells. In some embodiments, additional biomaterials, enzymes, chemicals, growth factors, and/or cells may be added.

As used herein, "transforming growth factor (TGF) superfamily" may refer to a large group of structurally related, soluble, dimeric, cell regulatory proteins that initiate and control proliferation and differentiation of many cell types in humans and animals.

As used herein, "biofluids" may refer to a mixture or slurry of cells and/or ECM components. In some embodiments, the biofluid may be chondrofluid or cartilage fluid. In other embodiments, the biofluid may be generated from other tissue types. Non-limiting examples of tissue types that may be used to generate biofluids include but are not limited to skin, cartilage, tendon, meniscus, temporomandibular joint (TW), penile tissues, urogenital tissues (e.g., urological tissues), intervertebral discs, bone, facet, ligaments, and other collagen-rich tissues and organs. In some embodiments, ECM components may include endogenous or exogenous proteins, such as collagen enzymes, glycosaminoglycans, proteoglycans, such as superficial zone protein (SZP)/lubricin/proteoglycan 4, and/or glycoproteins. In some embodiments, biofluids may include transforming growth factor (TGF) superfamily and/or others, such as growth differentiation factor (GDF), bone morphogenetic protein (BMP), fibroblast growth factor (FGF), epidermal growth factor (EGF), insulin-like growth factor (IGF). As used herein, "native tissue" is used to distinguish between tissues naturally present in animals and humans versus man-made tissues, e.g., engineered tissue. As used herein, "engineered tissue" may refer to cells planted into a scaffold or cells self-assembled/self-organized into tissue without the use of a scaffold, whereupon they reorganize it into a material suitable for use as an artificial tissue.

In some embodiments, melding agents may be added to a viscous solution, thickening agents, or hydrogel, such as but not limited to poloxamers, hyaluronic acid, starch, collagens, agarose, fibrin, gelatin, dextran, and dextrin. In other embodiments, the melding agents may be combined with exogenous biomaterials (e.g., bioadhesive materials). In some embodiments exogenous biomaterials may include but are not limited to hyaluronan or poloxamer.

In some embodiments, the melding process is stopped before the stiffness of the melded area exceeds the stiffness of the surrounding tissue (i.e., tissue that has not been melted and/or melded by methods described herein). In some embodiments, the melding process is stopped by washing the melding agents away. In other embodiments, the melding process is stopped by removing the catalyst (e.g., UV light) for melding. In further embodiments, the melding process is run to completion.

In some embodiments, completion of the melding process occurs when the melding agents applied to the solid matrix or tissue are depleted (i.e., used up). In other embodiments, completion of the melding process occurs when the melding agents become inactive (e.g., the enzyme is saturated or loses activity or the agent is metabolized and is no longer active).

In some embodiments, stiffness is measured via standard mechanical testing (or other optical or non-destructive methods).

In some embodiments, the melding process may comprise two phases, an acute phase, and a chronic phase. In some embodiments, the acute melding phase may occur instantaneously and is when two treated surfaces initially become attached. In some embodiments, the acute melding phase may occur during surgery and comprises the duration of surgery. In some embodiments, the chronic melding phase occurs after surgery, spanning from days to years, when solid matrix components from the two surfaces begin to remodel, and new bonds are formed.

In some embodiments, the chronic melding phase occurs in about 1 to 7 days or about 7 to 14 days. In some embodiments, the chronic melding phase occurs in about 3 to 5 weeks or about 5 to 8 weeks. In some embodiments, the chronic melding phase occurs in about 3 to 6 months or about 6 to 9 months, or about 9 to 12 months. In some embodiments, the chronic melding phase occurs in about 1 to 2 years or about 3 to 5 years or about 5 to 8 years, or about 8 to 12 years.

In some embodiments, each agent as described herein to be used in the Melt-and-Meld process may be applied with another treatment in combination to achieve the desired effects. Non-limiting examples of treatments may include cell therapy and tissue engineering.

Referring now to FIG. 1, FIG. 2, FIG. 3, FIG. 4, FIG. 5, FIG. 6A-6B and FIG. 7A-7B the present invention features methods of repairing/treating tissue defects, more particularly to a method that implements a Melt-and-Meld process to repair or treat the tissue defects.

The present invention features a method of treating a linear defect, fissure, or fibrillation. In some embodiments, the method comprises identifying the defect. In some embodiments, the method comprises melting the defect by applying melting agents such as extracellular matrix (ECM) protein-severing agents, denaturants, chaotropic agents, agents that remove negative charges, heat, or any combination thereof to the defect (FIG. 2). In other embodiments, the method comprises melding the melted defect by applying melding agents.

In some embodiments, a linear defect, fissure, or fibrillation may be characterized by rough, uneven, and/or irregular edges that serve as loci of further degeneration. As used herein, "linear" may refer to a defect that is long and thin and does not necessarily mean a defect that is straight. In some embodiments, a linear defect could be straight, or curved, or crooked.

in some embodiments, melding may comprise macromolecule formation, which can be attained through polymerization or any chemical process where two or more molecules are joined. A non-limiting example includes macromolecules formed by melding agents that promote the formation of a disaccharide or covalent bonds or the formation of pyridinoline and deoxypyridinoline junctions among smaller molecules to form a macromolecule and/or combinations thereof.

The present invention may also feature a method of repairing focal tissue defects treated with or without a cartilage implant. In some embodiments, the method comprises creating a neotissue. In some embodiments, the method comprises treating the neotissue with melting agents. In some embodiments, the method comprises recovering the treated neotissue products via centrifugation and removing the melting agents from the neotissue. In some embodiments, the method comprises recovering the treated neotissue products via inactivation of the melting agents. In some embodiments, the method comprises recovering the treated neotissue via inactivation of the melding agents, centrifugation, and removing the inactivated melding agents. In some embodiments, the treated neotissue products are mixed into medium containing melding agents. In some embodiments, the resulting mixture is loaded into a syringe. Finally, the syringe may be used to inject the neotissue products into a cartilage defect to create the melding effect.

In some embodiments, neotissues may be scaffold-based or scaffold-free. In other embodiments, neotissues may contain primary somatic cells, expanded somatic cells, stem cells, or a combination thereof. Methods used herein for creating neotissues are well known in the art.

In some embodiments, inactivation of melting agents comprises washing away the melting agents with water, saline, cell culture medium, or a combination thereof. In other embodiments, inactivation of melting agents comprises using chemicals that specifically deactivate the melting agents.

In some embodiments, inactivation of melding agents comprises washing away the melding agents with water, saline, cell culture medium. In other embodiments, inactivation of melding agents comprises using chemicals that specifically deactivate the melding agents. In further embodiments, the catalyst for melding (e.g., UV light) could be removed. In some embodiments, the melding agents are not inactivated. In other embodiments, the melding process is run to completion.

In some embodiments, a "focal tissue defect" may refer to a tissue defect equal to or less than 2.5 $cm^2$. In some embodiments, the tissue defect may be of any geometry; one non-limiting example may be a tissue defect that is round. In other embodiments, the tissue defect may be an irregular shape.

In some embodiments, a focal tissue defect may be about 2.5 $cm^2$ in size. In some embodiments, a focal tissue defect may be about 2.0 $cm^2$ in size. In some embodiments, a focal tissue defect may be about 1.5 $cm^2$ in size. In some embodiments, a focal tissue defect may be about 1.0 $cm^2$ in size. In some embodiments, a focal tissue defect may be about 0.5 $cm^2$ in size. In some embodiments, a focal tissue defect may be about 0.4 $cm^2$ in size. In some embodiments, a focal tissue defect may be about 0.3 $cm^2$ in size. In some embodiments, a focal tissue defect may be about 0.2 $cm^2$ in size. In some embodiments, a focal tissue defect may be about 0.1 $cm^2$ in size. In some embodiments, a focal tissue defect may be about 0.01 $cm^2$ in size. In some embodiments, a focal tissue defect may be less than 0.01 $cm^2$.

In some embodiments, a cartilage implant may include but is not limited to native cartilage, engineered cartilage, native osteochondral tissues, engineered osteochondral tissues, acellular scaffolds, new cartilage, cartilage spheres, or biofluids.

As used herein, "neotissue" may refer to newly formed tissue in vitro. In some embodiments, neotissue is generated using a scaffold. In some embodiments, neotissue is generated without the use of a scaffold. In some embodiments, neotissue may include tissue from cartilage, collagenous tissues, skin, bone, facet, ligaments, tendons, meniscus, TMJ, penile tissues, urogenital tissues in general (e.g., urological tissues), intervertebral discs, and other collagen-rich tissues or organs.

Non-limiting examples of how neotissue products are created/obtained include self-assembling cells to form a neotissue and then mincing the neotissue or by self-assembling cells directly into neotissue products.

In some embodiments, the piece of neotissue is 0.1 mm in diameter. In some embodiments, the piece of neotissue is 0.2 mm in diameter. In some embodiments, the piece of neotissue is 0.3 mm in diameter. In some embodiments, the piece of neotissue is 0.4 mm in diameter. In some embodiments, the piece of neotissue is 0.5 mm in diameter. In some embodiments, the piece of neotissue is 0.6 mm in diameter. In some embodiments, the piece of neocartilage is 0.7 mm in diameter. In some embodiments, the piece of neotissue is 0.8 mm in diameter. In some embodiments, the piece of neotissue is 0.9 mm in diameter. In some embodiments, the piece of neotissue is 1.0 mm in diameter. In other embodiments, a small piece of neotissue may have a diameter of about 0.1 mm, about 0.2 mm, about 0.3 mm, about 0.4 mm, about 0.5 mm, about 0.6 mm, about 0.7 mm, about 0.8 mm, about 0.9 mm, or about 1.0 mm. In other embodiments, a small piece of neotissue may have a diameter between 0.1 mm and 3.0 mm. In other embodiments, a small piece of neotissue may have a diameter smaller than 0.1 mm.

The present invention may also feature a method to repair large tissue defects treated with cartilage implants. In some embodiments, the method comprises: obtaining a piece of neotissue and applying melting agents to the neotissue. In some embodiments, the method comprises deactivating or removing the melting agents from the neotissue. In some embodiments, the method comprises applying the melting agents into the defect and then deactivating or removing the melting agents from the defect and applying the melding agents into the melted ECM of the defect, lastly, placing the neotissue into the defect.

In some embodiments, a "large tissue defect" may refer to a tissue defect greater than 2.5 cm$^2$. In some embodiments, a large tissue defect may require the insertion of an allograft or may require the defect to be covered by an allograft in order for the defect to be treated or repaired. In some embodiments, a large tissue defect may require the insertion of an engineered tissue or may require the defect to be covered by an engineered tissue in order for the defect to be treated or repaired. In some embodiments, a large tissue defect may require the insertion of an acellular tissue or may require the defect to be covered by an acellular tissue in order for the defect to be treated or repaired.

As used herein, an "allograft" may refer to a tissue graft from a donor of the same species as the recipient but not genetically identical. In some embodiments, the allograft is from a cadaver.

In some embodiments, a large tissue defect may be about 2.6 cm$^2$ in size. In some embodiments, a large tissue defect may be about 3.0 cm$^2$ in size. In some embodiments, a large tissue defect may be about 3.5 cm$^2$ in size. In some embodiments, a large tissue defect may be about 4.0 cm$^2$ in size. In some embodiments, a large tissue defect may be about 4.5 cm$^2$ in size. In some embodiments, a large tissue defect may be about 5.0 cm$^2$ in size. In some embodiments, a large tissue defect may be about 5.5 cm$^2$ in size. In some embodiments, a large tissue defect may be about 6.0 cm$^2$ in size. In some embodiments, a large tissue defect may be about 6.5 cm$^2$ in size. In some embodiments, a large tissue defect may be about 7.0 cm$^2$ in size. In some embodiments, a large tissue defect may be about 7.5 cm$^2$ in size. In some embodiments, a large tissue defect may be about 8.0 cm$^2$ in size. In some embodiments, a large tissue defect may be about 8.5 cm$^2$ in size. In some embodiments, a large tissue defect may be about 9.0 cm$^2$ in size. In some embodiments, a large tissue defect may be about 10.0 cm$^2$ in size. In some embodiments, a large tissue defect may be about 15.0 cm$^2$ in size. In some embodiments, a large tissue defect may be about 20.0 cm$^2$ in size. In some embodiments, a large tissue defect may be about 30.0 cm$^2$ in size. In some embodiments, a large tissue defect may be about 40.0 cm$^2$ in size. In some embodiments, a large tissue defect may be about 50.0 cm$^2$ in size. In some embodiments, a large tissue defect may be greater than 50.0 cm$^2$ in size.

In some embodiments, the neocartilage is obtained through a self-assembling process. In some embodiments, the self-assembling process may refer to a process in which cells spontaneously organize into tissue without external forces. In some embodiments, the neocartilage is obtained through a self-organizing process. In some embodiments, the self-organizing process may refer to a process in which external forces are used to help form a neotissue.

In some embodiments, the piece of neotissue is 1 mm in diameter. In some embodiments, the piece of neotissue is 2 mm in diameter. In some embodiments, the piece of neotissue is 3 mm in diameter. In some embodiments, the piece of neotissue is 4 mm in diameter. In some embodiments, the piece of neotissue is 5 mm in diameter. In some embodiments, the piece of neotissue is 6 mm in diameter. In some embodiments, the piece of neotissue is 7 mm in diameter. In some embodiments, the piece of neotissue is 8 mm in diameter. In some embodiments, the piece of neotissue is 9 mm in diameter. In some embodiments, the piece of neotissue is 10 mm in diameter. In other embodiments, a large piece of neotissue may have a diameter of about 1.0 mm, about 2.0 mm, about 3.0 mm, about 4.0 mm, about 5.0 mm, about 6.0 mm, about 7.0 mm, about 8.0 mm, about 9.0 mm, or about 10.0 mm. In other embodiments, the large piece of neotissue may have a diameter between 1.0 mm and 50.0 mm. In some embodiments, the large piece of neotissue may have a diameter greater than 50.0 mm.

In some embodiments, the Melt-and-Meld process (i.e., methods described herein) can be applicable to collagenous tissues in general, and may have utility in healing cartilage, skin, bone, facet, ligament, tendon, meniscus, TMJ, penile tissues, urogenital tissues in general (e.g., urological tissues), organs, intervertebral discs, and other collagen-rich tissues as well.

In some embodiments, the Melt-and-Meld process can be applied in conjunction with existing tissue treatments and also with treatments that are under development. Non-limiting examples include cell therapy and tissue engineering which are areas that hold promise for treating cartilage defects. In some embodiments, the Melt-and-Meld process can be used in conjunction with allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation.

In some embodiments, the present invention features a method of treating or ameliorating symptoms of a tissue defect. In other embodiments the present invention features a method of treating or ameliorating symptoms of a linear defect, fissure, or fibrillation. In further embodiments, the present invention features a method of treating or ameliorating symptoms of a smaller tissue defect (i.e., a focal tissue defect or a tissue defect ≤2.5 cm$^2$) or a large tissue defect (i.e., a tissue defect >2.5 cm$^2$). In some embodiments, the method comprises at least one of melting the defect by applying a melting agent, wherein the melting agent is a protease and melding the defect by applying a melding agent.

In some embodiments, the present invention features a method of treating or ameliorating symptoms of a tissue defect. In other embodiments the present invention features a method of treating or ameliorating symptoms of a linear defect, fissure, or fibrillation. In further embodiments, the present invention features a method of treating or ameliorating symptoms of a smaller tissue defect (i.e., a tissue defect ≤2.5 cm$^2$) or a large tissue defect (i.e., a tissue defect >2.5 cm$^2$). In some embodiments, the method comprises at least one melting the defect by turning a viscoelastic tissue solid into a viscoelastic tissue fluid and melding the defect by applying a melding agent.

In some embodiments, the present invention features a method of treating or ameliorating symptoms of a tissue defect. In other embodiments the present invention features a method of treating or ameliorating symptoms of a linear defect, fissure, or fibrillation. in further embodiments, the present invention features a method of treating or ameliorating symptoms of a smaller tissue defect (i.e., a tissue defect ≤2.5 cm$^2$) or a large tissue defect (i.e., a tissue defect >2.5 cm$^2$). In some embodiments, the method comprises melting the defect by applying a melting agent and melding the defect by applying a melding agent, wherein the melding agent is selected from: heat, laser, UV light or a combination thereof.

In some embodiments, the present invention features a method of treating or ameliorating symptoms of a tissue defect. In other embodiments the present invention features a method of treating or ameliorating symptoms of a linear defect, fissure, or fibrillation. In further embodiments, the present invention features a method of treating or ameliorating symptoms of a smaller tissue defect (i.e., a tissue defect ≤2.5 cm$^2$) or a large tissue defect (i.e., a tissue defect >2.5 cm$^2$). In some embodiments, the method comprises melting the defect and melding the defect by applying a melding agent effective for anchoring the tissue defect to tissue surrounding the tissue defect.

In some embodiments, the present invention features a method of treating or ameliorating symptoms of a tissue defect. In other embodiments the present invention features a method of treating or amelioratina symptoms of a smaller tissue defect (i.e., a tissue defect ≤2.5 cm$^2$) or a large tissue defect (i.e., a tissue defect >2.5 cm$^2$). In some embodiments, the method comprises melting the defect by applying a protease (e.g., collagenase or trypsin) to the tissue defect, and melding the defect by applying chondrofluid to the tissue defect. In some embodiments, the defect is further treated with biomaterials. In some embodiments, the biomaterial is poloxamer, hyaluronic acid, starch, collagens, agarose, fibrin, gelatin, dextran, dextrin, or a combination thereof. In other embodiments the chondrofluid comprises engineered neocartilage. In some embodiments the chondrofluid comprises engineered neocartilage and collagenase.

In some embodiments, the present invention features a method of treating or ameliorating symptoms of a linear defect, fissure, or fibrillation. In some embodiments, the method comprises melting the defect by applying a protease (e.g., collagenase or trypsin) to the linear tissue defect, fissure, or fibrillation, and melding the defect by applying chondrofluid to the linear tissue defect, fissure, or fibrillation. In some embodiments, the linear tissue defect, fissure, or fibrillation is further treated with biomaterials. In some embodiments, the biomaterial is starch. In other embodiments the chondrofluid comprises engineered neocartilage. In some embodiments the chondrofluid comprises engineered neocartilage and collagenase.

In some embodiments, the present invention features a method of treating or ameliorating symptoms of a linear defect, fissure, or fibrillation. In some embodiments, the method comprises melting the defect by applying a melting agent and melding the defect by applying a melding agent. In some embodiments, the melting agent is selected from: a protease, a dispose, a pepsin, an elastase, a hyaluronidase, an aggrecanase, a matrix metalloproteinase (MMPs), a collagenase, or a combination thereof. In other embodiments, the melting agent is selected from: guanidinium chloride, sodium dodecyl sulfate (SDS), chondroitinase-ABC, trypsin, a collagenase, or a combination thereof. In some embodiments, the melding agent is a member of the family of lysyl oxidase or lysyl oxidase-like proteins, transglutaminase, riboflavin, vitamin B12, genipin, or a combination thereof. In other embodiments, the melding agent is a bioactive agent that induces cells into producing a newly synthesized extracellular matrix. In further embodiments, the melding agent is selected from: a transforming growth factor (TGF), a growth differentiation factor (GDF), a bone morphogenetic protein (BMP), a fibroblast growth factor (FGF), an epidermal growth factor (EGF), an insulin-like growth factor (IGF), or a combination thereof. In some embodiments, the melding agent is chondrofluid. In other embodiments, the melding agent comprises poloxamer, hyaluronic acid, starch, collagens, agarose, fibrin, gelatin, dextran, dextrin, or a combination thereof. In some embodiments, the tissue defect is in articular cartilage. In other embodiments, the tissue defect is in other cartilages, skin, tendon, meniscus, temporomandibular joint (TMJ), penile tissues, urogenital tissues (e.g., urological tissues), intervertebral discs, bone, facet, ligaments, and other collagen-rich tissues and organs. In some embodiments, the methods described herein can be used independently or repeated in different amounts of times, orders, and combinations. In other embodiments, the aforementioned methods can be used in conjunction with treatments including but not limited to allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation.

In some embodiments, the present invention features a scaffold-free tissue-engineered implant composition comprising cells and endogenously produced extracellular matrix and growth factors.

EXAMPLES

The following are non-limiting examples of the present invention. It is to be understood that said examples are not intended to limit the present invention in any way. Equivalents or substitutes are within the scope of the present invention.

Example 1

Treatment of Linear Defects, Fissures, or Fibrillations

After melting of the defect, factors to stimulate extracellular matrix (ECM) production, agents to stimulate chondrocyte migration to the wound site, and agents to stimulate chondrocyte proliferation and/or differentiation at the wound site may also be added in addition to melding agents. These cell recruitment and cell therapy strategies can use the Melt-and-Meld process as an adjunctive treatment. All components including chondrofluid may be suspended in an injectable viscous solution or hydrogel, such as poloxamer and/or hyaluronic acid.

Example 2

Treatment for Focal to Large Defects

Linear defects, fissures, or fibrillations, progress to focal defects and then to large detects. After melting of the defect as described above, A) a suspension of engineered neotissues, B) engineered ECM components and cells, or chondrofluid, or C) both in combination may be applied to the defect in addition to melding agents. For A), small, immature engineered neocartilage constructs may be suspended in a low volume of medium, viscous solution, or hydrogel, such as poloxamer and/or hyaluronic acid, containing melding agents, as well as factors to stimulate ECM formation, agents to stimulate chondrocyte migration, and agents to stimulate chondrocyte proliferation and injected into the defect site. Alternatively, mature neocartilage constructs of the same size may be used after brief treatment with agents which remove negative charges, ECM protein-severing agents, or combinations thereof. Melding agents may be added to the viscous solution or hydrogel. For B), engineered ECM components and cells capable of producing chondrogenic proteins may be liberated from engineered neotissues or native tissues by digesting the tissues with ECM protein-severing agents. After digestion, the resulting cells and ECM components may be centrifuged to remove the severing agents. The remaining liberated cells and matrix components may be resuspended in a low volume of viscous solution or hydrogel containing melding agents and factors to stimulate ECM production, agents to stimulate chondrocyte migration, and agents to stimulate chondrocyte proliferation. For C), both small engineered neotissues, as well as liberated cells and ECM components may be combined in a viscous solution or hydrogel, such as poloxamer and/or hyaluronic acid, containing melding agents, as well as factors to stimulate ECM production, agents to stimulate chondrocyte migration, and agents to stimulate chondrocyte proliferation.

Example 3

Treatment for Focal to Large Defects with a Neocartilage Implant

To heal a large defect with a single, biomimetic engineered construct, native tissue should first be melted, as described above. Following this, a viscous solution or hydrogel containing liberated cells and ECM components, as well as factors to stimulate ECM production, agents to stimulate chondrocyte migration, and agents to stimulate chondrocyte proliferation, may be added to the defect site followed by implantation of the large neocartilage construct and addition of melding agents.

As used herein, the term "about" refers to plus or minus 10% of the referenced number.

Although the preferred embodiments of the present invention have been shown and described, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of," and as such the written description requirement for claiming one or more embodiments of the present invention using the phrase "consisting essentially of" or "consisting of" is met.

Embodiments

The following embodiments are intended to be illustrative only and not to be limiting in any way.

Embodiment 1: A method of treating or ameliorating symptoms of a tissue defect, the method comprising at least one of: melting the defect by applying a melting agent; and melding the defect by applying a melding agent.

Embodiment 2: The method of embodiment 1, wherein the tissue defect is a linear defect, fissure, or fibrillation.

Embodiment 3: The method of embodiment 1, wherein the tissue defect is a focal tissue defect ($\leq 2.5$ cm$^2$).

Embodiment 4; The method of embodiment 1, wherein the tissue defect is a large tissue defect ($>2.5$ cm$^2$).

Embodiment 5: A method of treating or ameliorating symptoms of a linear defect, fissure, or fibrillation, the method comprising at least one of: melting the defect by applying a melting agent; and melding the defect by applying a melding agent.

Embodiment 6: A method of treating or ameliorating symptoms of a focal defect ($\leq 2.5$ cm$^2$), the method comprising at least one of: melting the defect by applying a melting agent; and melding the defect by applying a melding agent.

Embodiment 7: A method of treating or ameliorating symptoms of a large defect ($>2.5$ cm$^2$), the method comprising at least one of: melting the defect by applying a melting agent; and melding the defect by applying a melding agent.

Embodiment 8: The method of any one of embodiments 1-7, wherein melting is a method of turning a viscoelastic tissue solid into a viscoelastic tissue fluid.

Embodiment 9: The method of any one of embodiments 1-8, wherein melting agents are a chemical and/or an enzyme that helps to melt a tissue matrix.

Embodiment 10: The method of embodiment 9, wherein the melting agents comprise a protease or other extracellular matrix (ECM)-degrading enzymes, chaotropes, or solvents including dispase, pepsin, elastase, hyaluronidase, aggrecanase, matrix metalloproteinase (MMP), chondroilinase-ABC, trypsin, collagenase, guanidinium chloride, sodium dodecyl sulfate (SDS), or a combination thereof.

Embodiment 11: The method of any one of embodiments 1-10, wherein the melting agent is heat and/or a laser that helps to melt a tissue matrix.

Embodiment 12: The method of any one of embodiments 1-11, wherein melding is a method of anchoring the melted tissue in the defect to tissue surrounding the melted defect.

Embodiment 13: The method of any one of embodiments 1-12, wherein melding is a method of joining tissue matrices and/or melted tissue matrices together by the formation of macromolecules.

Embodiment 14: The method of embodiment 13, wherein the formation of macromolecules comprises linking smaller molecules together.

Embodiment 15: The method of any one of embodiments 1-14, wherein melding is caused by the physical entanglement of molecules in the tissue matrix including friction between two adjacent surfaces, wherein the adjacent surfaces comprise a surface of the melted tissue and a surface of the tissue surrounding the defect.

Embodiment 16: The method of any one of embodiments 1-15, wherein melding is caused by cell migration.

Embodiment 17: The method of any one of embodiments 1-16, wherein the melding agent contains live cells.

Embodiment 18: The method of any one of embodiments 1-17, wherein the melding agent is chondrofluid derived from engineered neocartilage.

Embodiment 19: The method of embodiment 18, wherein the engineered neocartilage is derived using the self-assembling process.

Embodiment 20: The method of any one of embodiments 1-19, wherein the melding agents contain extracellular matrix (ECM) molecules capable of forming macromolecules with native tissue.

Embodiment 21: The method of any one of embodiments 1-20, wherein the melding agents contain enzymes or chemicals or growth factors that are capable of catalyzing the formation of macromolecules, forming macromolecules, or stimulating the formation of macromolecules, such as crosslinks within tissue.

Embodiment 22: The method of embodiment 21, wherein the melding agents comprise a family of lysyl oxidase or lysyl oxidase-like proteins, transglutaminase, riboflavin, vitamin B12, genipin, a transforming growth factor (TGF), growth differentiation factor (GDF), bone morphogenetic protein (BMP), fibroblast growth factor (FGF), epidermal growth factor (EGF), insulin-like growth factor (IGF), or a combination thereof.

Embodiment 23: The method of any of embodiments 1-22, wherein the melding agents contain biomaterials, wherein the biomaterial comprises poloxamer, hyaluronic acid, starch, collagen, agarose, fibrin, gelatin, dextran, dextrin, or a combination thereof.

Embodiment 24: The method of any one of embodiments 1-23, wherein the melding agents are molecules capable of crosslinking collagen to form macromolecules.

Embodiment 25: The method of any one of embodiments 1-24, wherein the melding agents comprise heat, laser, UV light or a combination thereof.

Embodiment 26: The method of any one of embodiments 1-25, wherein the melding agents are capable of forming macromolecules.

Embodiment 27: The method of any one of embodiments 1-26, wherein the tissue defect is in skin, cartilage, penile tissues, urogenital tissues (e.g., urological tissues), tendon, meniscus, temporomandibular joint (TMJ), intervertebral discs, bone, facet, ligaments, and other collagen-rich tissues and organs.

Embodiment 28: The method of any one of embodiments 1-27, wherein the method (a) and (b) can be used independently or repeated in different amounts of times, orders, and combinations.

Embodiment 29: The method of any one of embodiments 1-28, wherein the method (a) can be used in conjunction with treatments including but not limited to allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation.

Embodiment 30: The method of any one of embodiments 1-29, wherein the method (b) can be used in conjunction with treatments including but not limited to allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation.

Embodiment 31: A method of treating or ameliorating symptoms of a tissue defect, a method comprising at least one of: melting the defect by applying a melting agent, the melting agent is a protease; and melding the defect by applying a melding agent.

Embodiment 32: A method of treating or ameliorating symptoms of a tissue defect a method comprising at least one of: melting the defect by turning a viscoelastic tissue solid into a viscoelastic tissue fluid; and melding the defect by applying a melding agent.

Embodiment 33: The method of embodiments 31 or 32, wherein the tissue defect is a linear defect, fissure, or fibrillation.

Embodiment 34: The method of embodiments 31 or 32, wherein the tissue defect is a focal tissue defect ($\leq 2.5$ cm$^2$).

Embodiment 35: The method of embodiments 31 or 32, wherein the tissue defect is a large tissue defect ($>2.5$ cm$^2$).

Embodiment 36: The method of any one of embodiments 31-35, wherein melding is a method of anchoring the melted tissue to tissue surrounding the defect.

Embodiment 37: The method of any of embodiments 31-36, wherein melding is a method of joining tissue matrices and/or melted tissue matrices together by the formation of macromolecules.

Embodiment 38: The method of embodiment 37, wherein the formation of macromolecules comprises linking smaller molecules together.

Embodiment 39: The method of any one of embodiments 31-38, wherein melding is caused by the physical entanglement of molecules in the tissue matrix.

Embodiment 40: The method of any one of embodiments 31-39, wherein the melding agents are enzymes capable of catalyzing the formation of macromolecules with native tissue.

Embodiment 41: The method of any one of embodiments 31-40, wherein the melding agents are molecules capable of crosslinking collagen to form macromolecules.

Embodiment 42: The method of any one of embodiments 31-41, wherein the method (a) and (b) can be used independently or repeated in different amounts of times, orders, and combinations.

Embodiment 43: A method of treating or ameliorating symptoms of a tissue defect, a method comprising at least one of: melting the defect by applying a melting agent; and melding the defect by applying a melding agent, the melding agent is selected from: heat, laser, UV light or a combination thereof.

Embodiment 44: A method of treating or ameliorating symptoms of a tissue defect, a method comprising at least one of: melting the defect by applying a melting agent; and melding the defect by applying a melding agent effective for anchoring the melted tissue to tissue surrounding the defect.

Embodiment 45: The method of embodiments 43 or 44, wherein the tissue defect is a linear defect, fissure, or fibrillation.

Embodiment 46: The method of embodiments 43 or 44, wherein the tissue defect is a focal tissue defect ($\leq 2.5$ cm$^2$).

Embodiment 47: The method of embodiments 43 or 44, wherein the tissue defect is a large tissue defect ($>2.5$ cm$^2$).

Embodiment 48: The method of any of embodiments 43-47, wherein melting is a method of turning a viscoelastic tissue solid into a viscoelastic tissue fluid.

Embodiment 49: The method of any of embodiments 43-48, wherein melting agents are a chemical and/or an enzyme that helps to melt a tissue matrix.

Embodiment 50: The method of any of embodiments 43-49, wherein the melting agent is heat and/or a laser that helps to melt a tissue matrix.

Embodiment 51: A method of treating or ameliorating symptoms of a tissue defect, a method comprising at least one of: melting the defect by applying a protease to the tissue defect; and melding the defect by applying chondrofluid to the tissue defect.

Embodiment 52: The method of embodiment 51, wherein the tissue defect is a linear defect, fissure, or fibrillation.

Embodiment 53: The method of embodiment 51, wherein the tissue defect is a focal tissue defect (≤2.5 cm$^2$).

Embodiment 54: The method of embodiment 51, wherein the tissue defect is a large tissue defect (>2.5 cm$^2$).

Embodiment 55: A method of treating or ameliorating symptoms of a linear tissue defect, fissure, or fibrillation, a method comprising at least one of: melting the defect by applying a protease to the linear tissue defect, fissure, or fibrillation; and melding the defect by applying chondrofluid to the linear tissue defect, fissure, or fibrillation.

Embodiment 56: The method of any one of embodiments 51-55, wherein chondrofluid is derived from engineered neocartilage.

Embodiment 57: The method of any one of embodiments 51-56, wherein the linear tissue defect, fissure, or fibrillation is further treated with biomaterials comprising poloxamer, hyaluronic acid, starch, collagen, agarose, fibrin, gelatin, dextran, dextrin or a combination thereof.

Embodiment 58: The method of any one of embodiments 51-57, wherein the protease is collagenase.

Embodiment 59: The method of any one of embodiments 51-58, wherein the protease is trypsin.

Embodiment 60: A method of treating or ameliorating symptoms of a linear tissue defect, fissure, or fibrillation, a method comprising at least one of: melting the defect by applying a melting agent; and melding the defect by applying a melding agent.

Embodiment 61: The method of embodiment 60, wherein the melding agent is a member of the family of lysyl oxidase or lysyl oxidase-like proteins, transglutaminase, riboflavin, vitamin B12, genipin, or a combination thereof.

Embodiment 62: The method of embodiment 60, wherein the melding agent is a bioactive agent that induces cells into producing a newly synthesized extracellular matrix.

Embodiment 63: The method of embodiment 60, wherein the melding agent is selected from: a transforming growth factor (TGF), growth differentiation factor (GDF), bone morphogenetic protein (BMP), fibroblast growth factor (FGF), epidermal growth factor (EGF), insulin-like growth factor (IGF), or a combination thereof.

Embodiment 64: The method of embodiment 60, wherein the melding agent is chondrofluid.

Embodiment 65: The method of embodiment 60, wherein the melding agents contain biomaterials, wherein the biomaterial comprises poloxamer, hyaluronic acid, starch, collagen, agarose, fibrin, gelatin, dextran, dextrin, or a combination thereof.

Embodiment 66: The method of embodiment 60, wherein the tissue defect is in articular cartilage.

Embodiment 67, The method of embodiment 60, wherein the tissue defect is in skin, cartilage, penile tissues, urogenital tissues (e.g., urological tissues), tendon, meniscus, temporomandibular joint (TMJ), intervertebral discs, bone, facet, ligaments, and other collagen-rich tissues and organs.

Embodiment 68: The method of any one of embodiments 60-67, wherein the method (a) and (b) can be used independently or repeated in different amounts of times, orders, and combinations.

Embodiment 69: The method of any one of embodiments 60-68, wherein the method (a) can be used in conjunction with treatments including but not limited to allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation Embodiment 70: The method of any one of embodiments 60-69, wherein the method (b) can be used in conjunction with treatments including but not limited to allografts, autografts, xenografts, cell therapies, debridement, laser, infrared, ultrasound, radiofrequency, platelet rich plasma (PRP), bone marrow aspirates, stem cell therapies, chemotherapy, radiation, the injection of or treatment with pharmaceuticals or visco therapy, acellular implants or injections, scaffold-based tissue engineered implants, scaffold-free tissue engineered tissue implants, microfracture, and/or marrow stimulation.

What is claimed is:

1. A method of treating or ameliorating symptoms of a tissue defect, the method comprising:
    a) generating an engineered tissue comprising passaged and rejuvenated cells self-assembled/self-organized into a tissue without the use of a scaffold;
    b) generating biofluid by applying a tissue-degrading enzyme to the engineered tissue generated in (a) and
    c) melding the defect by applying the biofluid generated in (b) to the defect without a scaffold to cause cell migration, formation of macromolecules, and/or physical entanglement of molecules in a tissue matrix, including friction between two adjacent surfaces, wherein the adjacent surfaces comprise a surface of the defect and a surface of the tissue surrounding the defect, wherein the biofluid is a slurry of cells and their endogenously produce d extracellular matrix (ECM) in structures <500 µm in size.

2. The method of claim 1, wherein the melding anchors the tissue in the defect to tissue surrounding the defect.

3. The method of claim 1, wherein the melding comprises cell migration.

4. The method of claim 1, wherein the biofluid is chondrofluid derived from engineered neocartilage.

5. The method of claim 1, wherein the biofluid comprises an enzyme of the family of lysyl oxidase or lysyl oxidase-like proteins, transglutaminase, riboflavin, vitamin B12, genipin, a transforming growth factor (TGF), growth differentiation factor (GDF), bone morphogenetic protein (BMP), fibroblast growth factor (FGF), epidermal growth factor (EGF), insulin-like growth factor (IGF), or a combination thereof.

6. The method of claim 1, wherein the melding comprises applying heat, laser, UV light or a combination thereof.

7. The method of claim 1, wherein the tissue defect is in skin, cartilage, penile tissue, urogenital tissue, tendon, meniscus, temporomandibular joint (TMJ), intervertebral disc, bone, facet, or ligament.

8. The method of claim 1, wherein the method is used in conjunction with a treatment comprising cartilage treatment, allograft, autograft, xenograft, cell therapy, debridement, laser, infrared, ultrasound, radiofrequency, platelet rich plasma (PRP), bone marrow aspirate, stem cell therapy, chemotherapy, radiation, the injection of or treatment with a pharmaceutical or visco therapy, acellular implant or injection, scaffold-based tissue engineered implant, scaffold-free tissue engineered tissue implant, microfracture, and/or marrow stimulation.

\* \* \* \* \*